Jan. 15, 1935.  W. C. SCHEU ET AL  1,987,873
FRUIT COUNTING AND REGISTERING APPARATUS
Original Filed Dec. 13, 1924  3 Sheets-Sheet 2
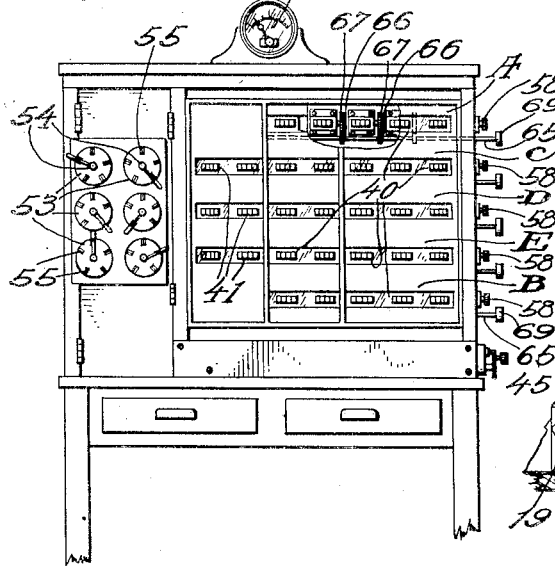
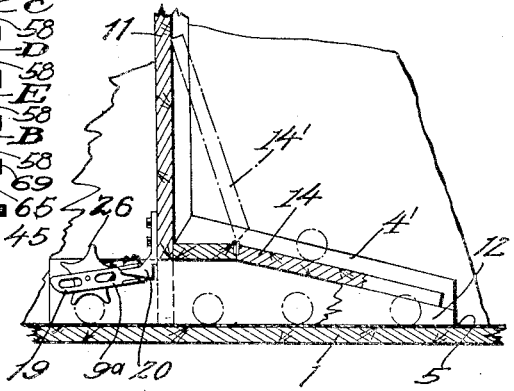
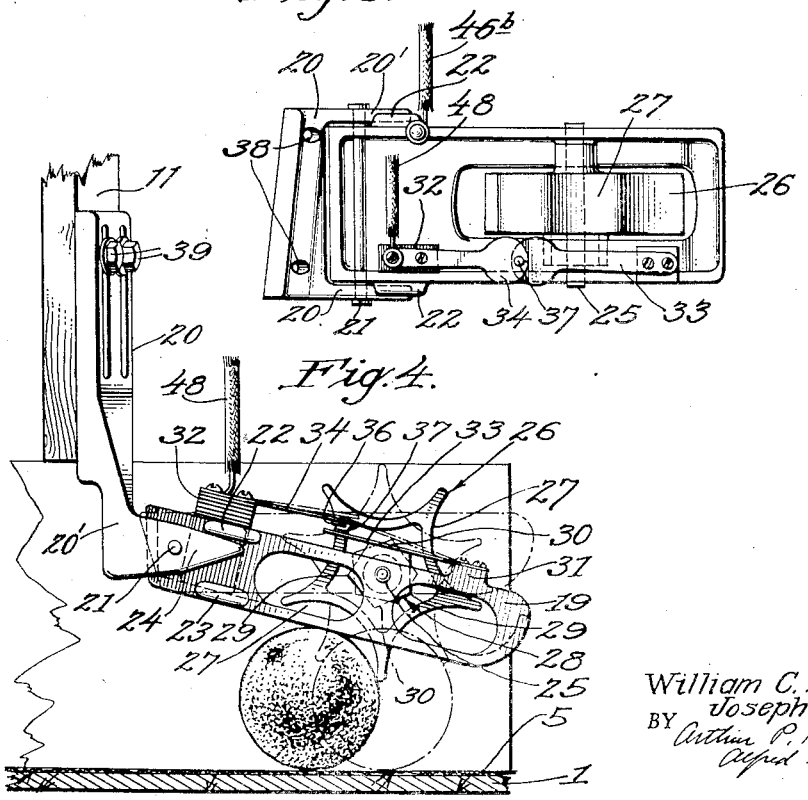
INVENTOR.
William C. Scheu
Joseph H. Hemmerly
BY
ATTORNEYS.

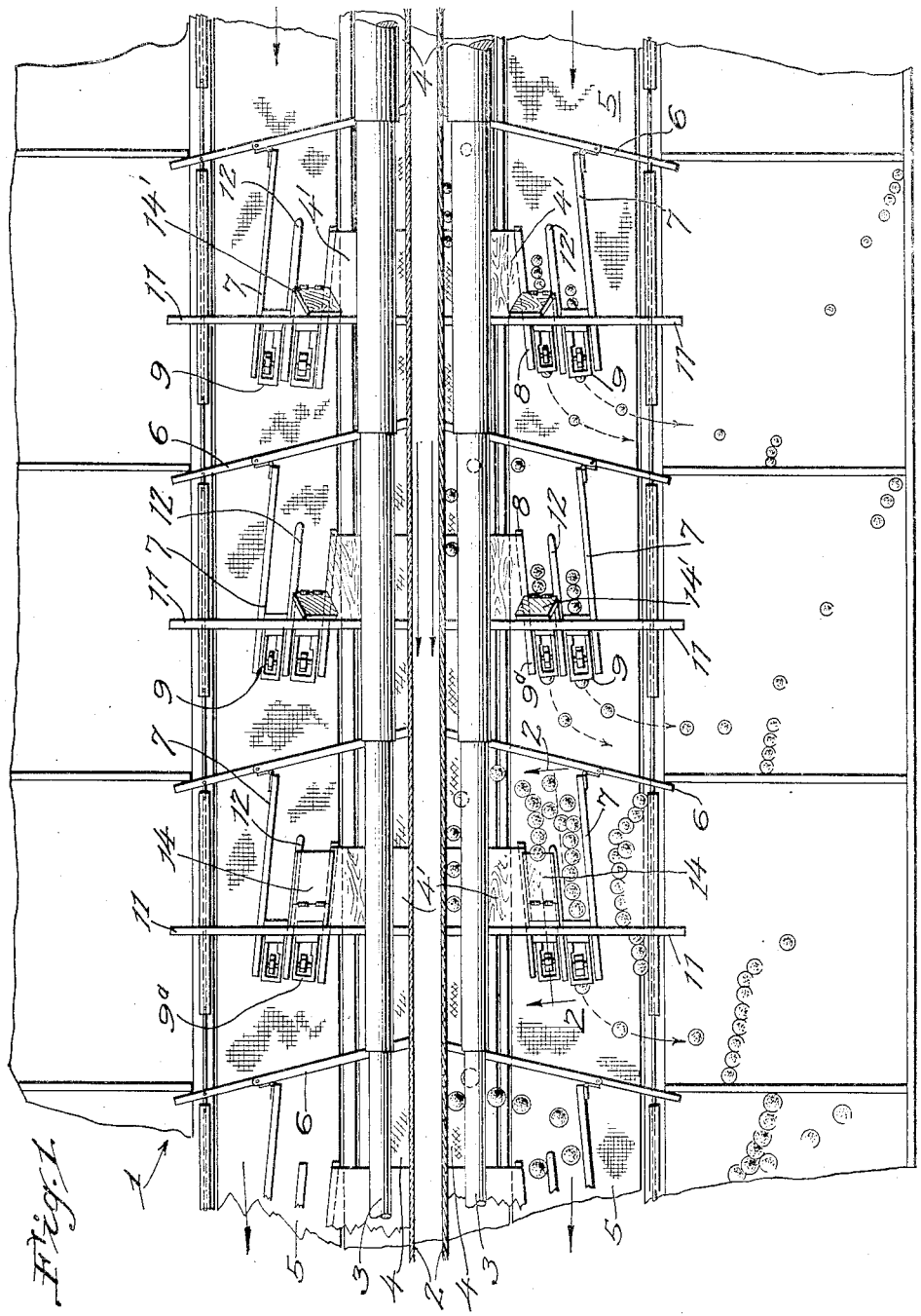

Patented Jan. 15, 1935

1,987,873

UNITED STATES PATENT OFFICE 1,987,873

FRUIT COUNTING AND REGISTERING APPARATUS

William C. Scheu, Upland, and Joseph H. Hemmerly, Pomona, Calif., assignors to Scheu Manufacturing Company, Upland, Calif., a corporation of California Original application December 13, 1924, Serial No. 755,684. Divided and this application May 17, 1930, Serial No. 453,199

1 Claim. (Cl. 235—98)

This invention relates to fruit counting and registering apparatus and is more particularly directed to an apparatus for use in connection with fruit sizing apparatus. The apparatus comprises, in general, counting apparatus positioned adjacent the sizing apparatus and adapted for the counting of separate articles of fruit of the several different sizes under varying conditions as to quantity of fruit in the respective sizes, and means at a central point removed from the sizing apparatus for registering the number of articles of fruit of each size counted by the counting apparatus.

This application is a division of our application Ser. No. 755,684, filed December 13, 1924 issued March 10, 1931, Patent No. 1,795,511.

The principal object of this invention is to provide fruit counting and registering means having certain novel and advantageous features which render it more efficient and economical than the means heretofore used for this purpose.

A particular object of the invention is to provide a fruit counting apparatus in which the fruit of any one size or grade is caused to be delivered to and counted by a main counting device so long as the rate of supply of such fruit does not exceed the rate at which it may be so delivered and counted, while fruit supplied in excess of the rate at which it may be delivered to and counted by said main counting device is automatically caused to be delivered to and counted by an auxiliary counting device.

Certain apparatus embodying our invention is illustrated in the accompanying drawings and referring thereto:

Fig. 1 is a partial plan view of a fruit sizing and distributing apparatus provided with counting means according to our invention.

Fig. 2 is a section on line 2—2 in Fig. 1.

Fig. 3 is a plan view of one of the counting elements shown in Fig. 1.

Fig. 4 is a side elevation of the counting element shown in Fig. 3.

Fig. 5 is a front elevation of the assembly of a plurality of registering devices in a system according to our invention.

Figure 7:
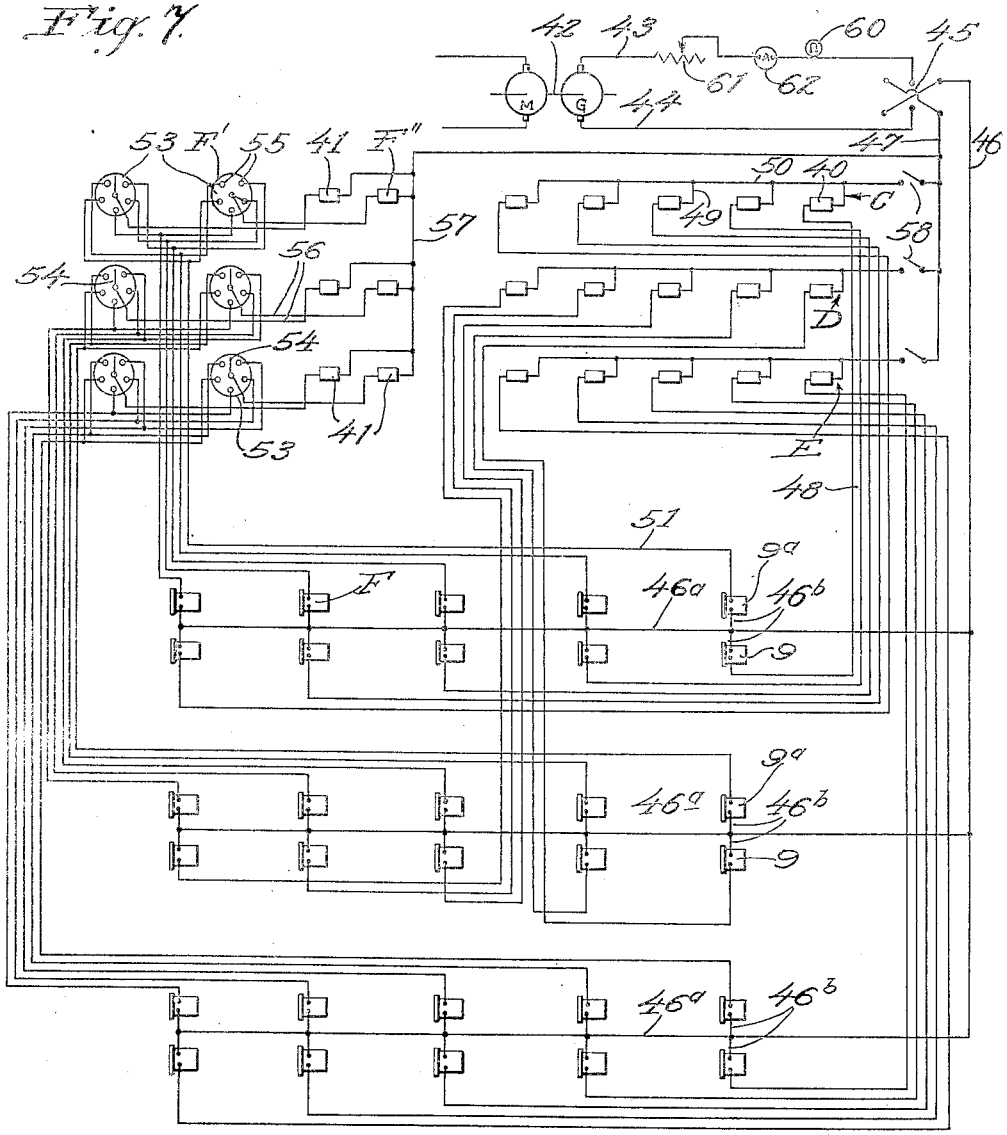
Fig. 7 is a wiring diagram showing the electrical circuits of our apparatus including the connections from the main and auxiliary counting elements to the main and auxiliary registering devices respectively.

Referring to the drawings, 1 designates a table over which the fruit to be sized is conveyed by suitable means such as ropes 2 travelling in the direction indicated by the arrows between said ropes and cooperating with the rotating rollers 3 to separate the fruit into the respective sizes. The separation or sizing of the fruit is shown as attained through the use of rollers having sections of successively decreasing diameter so that the peripheral surfaces of said sections are spaced by increasing distances from the ropes 2. It will be understood, however, that our invention is not dependent upon the use of this or any other particular means of separating the fruit according to size, but may be used in connection with any form of sizing apparatus. The portion 4 of the table beneath the space between each of the ropes 2 and the first portion of each section of the rollers 3 is adapted to receive fruit falling through said space, and inclined runways 4' are preferably provided for delivering all of the fruit falling through any such space toward one end thereof. Extending along the opposite sides of the table are conveyor belts 5 or other suitable conveying means, travelling preferably in the same direction as the conveyors 2, as also indicated by arrows. The conveyor belts 5 are preferably inclined somewhat downwardly toward their outer edges transverse to the direction of travel thereof so as to cause the fruit delivered onto one of said belts to move in an inclined direction with respect to the direction of travel of the belt, due to the combined influence of the movement of the belt and the action of gravity.

Partition or guide members 6 may be provided, extending across the table and the respective conveyor belts so as to divide the surface thereof into compartments for handling fruit of the respective sizes, and additional partitions or guide members 7 may also be provided for guiding all of the fruit of each size into operative engagement with the corresponding counting means. The partitions or guides 7 are shown as inclined somewhat with respect to the direction of travel of the conveyor belts and preferably extend substantially parallel to the normal direction of travel of the fruit when moving freely over the combined action of the belt movement and the force of gravity. Extending over each conveying means 5 and inwardly from the partition 7 are additional partitions and guide members 12 and 8. Said partitions preferably extend substantially parallel to the partitions 7 so as to define the main fruit passage between the partitions 7 and 12 and an auxiliary fruit passage between the partitions 12 and 8, within which passages are mounted the main counting elements 9 and the auxiliary counting elements 9a respectively, it being understood that the auxiliary passage and auxiliary counting element may be provided for each size of fruit in which there is apt to be any excess over the number which may be counted by the main counting element, and may, if desired, be omitted for other sizes. The partition or guide members 7, 12 and 8 and the counting elements 9 and 9a may be supported on transverse supporting members 11.

The upper counting element 9a is termed an auxiliary or overload counting element since it is used only in case the fruit of that particular size is delivered at too fast a rate to be handled by the corresponding main counting element alone. The end portions of the partitions 12 and 8 are inclined downwardly in the reverse direction to the travel of the conveying means 5, as shown in Fig. 2, and in order to normally prevent entrance of fruit into the auxiliary passage therebetween, a gate 14 is hingedly mounted adjacent the upper ends of the inclined portions of said partitions. Said gate may be lowered against the inclined upper edges of said partitions, as shown at 14 in Fig. 1 and in full lines in Fig. 2, so as to cause all of the fruit to pass to the main counting element or may be raised to the position shown at 14' in Fig. 1 and in dotted lines in Fig. 2, so as to permit a portion of the fruit to pass through the auxiliary passage to the auxiliary counting element 9a.

The construction of the counting elements is shown particularly in Figs. 3 and 4. The counting element there shown is indicated as one of the main counting elements 9, but it will be understood that the illustration and description thereof applies equally well to the auxiliary counting elements 9a. Said counting element comprises a frame 19 preferably of light material such as aluminum, which is preferably mounted to swing toward or away from the conveyor belt 5 (that is, to swing substantially vertically) in a plane inclined somewhat with respect to the direction of travel of said conveying means, said plane of movement of the frame being inclined toward the outer or lower edge of the conveyor belt in the direction of travel thereof. For this purpose said frame is shown as pivotally mounted upon a pin 21 which is angularly offset from the perpendicular to the direction of travel of the conveyor belt and which is shown as supported between arms 20' at the lower end of a relatively fixed support 20. Said relatively fixed support may be mounted upon the supporting members 11 aforesaid, and are preferably provided with means for vertical adjustment thereof, such as bolts or screws 39 passing through vertical slots 38 in the member 20 and adapted to clamp said member in any position of vertical adjustment permitted by the height of said slots. It is evident, therefore, that the frame 19 is free to be raised as may be required upon movement of the fruit therebeneath. Said frame may be advantageously provided with stop members 22 and 23, cooperating with the tapered ends 24 of the arms 20' to limit the swinging movement of frame 19.

A star wheel 26 is rotatably mounted within the frame 19 as by means of pin or shaft 25, said star wheel having a plurality of angularly spaced points or projections connected by curved surfaces 27 of approximately the same diameter or curvature as the fruit to be counted. Mounted at one side of said star wheel and secured to rotate therewith is a contact actuating element 28 having a plurality of raised points 29 corresponding in number and angular spacing to the projections of star wheel 26 and separated by flat or relatively depressed surfaces 30.

Two resilient contact keys or members 33 and 34 are mounted in position for operation by the projections of the contact actuating element 28, the contact member 33 being shown as mounted beneath the member 34 and adapted to be raised so as to bring the respective contact points 36 and 37 into engagement upon passage of each of the projections 29 therebeneath and adapted by its own resilience to separate said contact points when the succeeding depressed surface 30 is brought into position therebeneath. Any suitable means may be provided for making the electrical connections to the respective contact members 33 and 34, but we have shown the contact member 33 as mounted directly upon a portion 31 of the frame 19 so as to be electrically connected thereto, and the electrical connection to said contact member may be made by means of a wire 46b connected to any suitable portion of said frame, while the other contact member 34 is shown as mounted upon an insulating support 32 and the other electrical connection 48 is directly connected to said last named contact member.

In Fig. 5 is shown a register board or assembly for use in connection with counting means such as above described. This particular board is designed for use in a packing house where five different grades of fruit are being sized, counted, and packed, and in which the fruit of each grade is sized into five different sizes. The registering devices for the fruit of the respective grades are mounted in the horizontal rows designated respectively at A, B, C, D, and E. The row or set of registering devices for each grade comprises five main magnetic registering devices indicated at 40, corresponding to the five different sizes of fruit in that grade and each connected to the corresponding main counting element. The board is not shown as provided with any auxiliary registering devices for the grades A and B, but for each of the grades C, D and E, a suitable number of auxiliary magnetic registers 41 (shown in this case as two such auxiliary registers for each grade) are provided, such auxiliary registers being advantageously mounted in the same horizontal row as the main registers for the corresponding grades and being connected to suitable switching means whereby they may be connected electrically to any certain ones of the auxiliary counting elements 9a of the corresponding grades. The switching means for this purpose may comprise multiple-throw switches indicated at 53 corresponding in number to the auxiliary registering devices, the multiple-throw switches for the auxiliary registering devices of the respective grades C, D and E being shown as mounted in rows also designated in Fig. 7 by the letters C, D and E. Each of said multiple-throw switches is shown as provided with a central contact arm 54 which is electrically connected to the corresponding auxiliary registering device and which is adapted to make contact with any one of a plurality of contacts 55 which are electrically connected to the auxiliary counting elements 9a for the several different sizes of the corresponding grade of fruit. Switches 58 are preferably situated at one end of the register board and connected in one of the electrical conductors leading to the registering devices 40 and 41 of the respective grades so that the current may be cut off from any set of such registering devices when the sizing machine used in sizing fruit of that particular grade is not in operation. The electrical circuits for the apparatus will be described more fully hereinafter.

Figure 6:
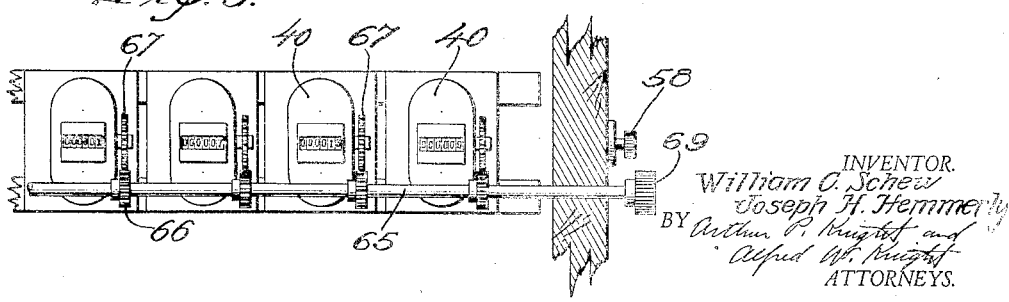
Fig. 6 is a fragmentary side elevation of a plurality of such registering devices of a set corresponding to fruit of one particular grade, illustrating the setback mechanism therefor.

Means are also preferably provided, as shown particularly in Fig. 6 for turning back to zero reading the registers 40 and 41 when any particular lot of fruit has been sized and counted. Such means may comprise a shaft 65 extending adjacent each row of registers 40 and 41 and having an operating handle 69 at one end of the board and being operatively connected with each register by means of a pinion 66 mounted on the shaft 65 to engage the turnback gear 67 of the register which operates the turnback mechanism thereof. The magnetic registers themselves, including the individual turnback mechanism with which each register is provided, are of a well known type and need not be illustrated or described in detail here. However, the provision of a single operating means such as shaft 65, operatively connected to the turnback mechanism of all of the registers of each set, whereby all of such registers may be simultaneously restored to zero reading by a single operation, is believed to be new and comprises a part of our invention.

Referring to Fig. 7, current for the actuating of magnetic registers 40 and 41 is shown as supplied by means of a motor generator illustrated at 42 whose output leads 43 and 44 are connected to a double throw reversing switch 45 so that the direction of flow of current through the circuits may be reversed from time to time to equalize the wearing away of the contact points 36 and 37 of the counting elements. From said double throw switch the wire 46 leads to the branch wires 46a and 46b, the wires 46b being each connected to one terminal of one of the main or auxiliary counting elements 9 or 9a. From the other terminal of each main counting element 9, a wire 48 leads to the corresponding main magnetic register 40. Said main magnetic registers are connected to the other side of the line by means of wires 49 and 50, switches 58 aforesaid and wire 47. The other terminal of each auxiliary counting element 9a is connected by a wire 51, to one of the contacts 55 of each of the multiple-throw switches 53 corresponding to that particular grade of fruit. The central contact arm 54 of each of said multiple-throw switches is connected by a wire 56 to the corresponding auxiliary magnetic registering device 41 while all of said last named devices are connected by wire 57 to the wire 47 aforesaid and thence back to the line. An electric lamp 60 may be connected in series in the output circuit of the motor generator in order to indicate when current is being supplied to the system, and rheostat 61 and ammeter 62 may also be included in the circuit for respectively regulating and indicating the amount of current flow so as to provide the proper current for operation of the magnetic registering devices. In this wiring diagram we have shown the counting elements and registers for only those sizes which are provided with auxiliary counting and registering means, namely the sizes C, D and E of Fig. 5, but it will be understood that the main counting elements and registering devices for sizes A and B are connected in the same manner as the corresponding parts for the sizes shown.

In the operation of the above described apparatus, the fruit to be counted is delivered to the sizing apparatus and is separated in its passage along the rollers 3 into a number of sizes corresponding to the respective portions of said rollers. In the table shown in Fig. 1, fruit of one grade may be delivered at one side and fruit of another grade at the other side, the fruit of the several different sizes in each grade passing through the counting elements at the corresponding side of the table. The fruit of each size, in being moved past the corresponding counting elements, engages the projections of the star wheel 26 and each fruit causes such star wheel, together with the actuating element 28, to be rotated through an angle corresponding to the spacing of the projections on the star wheel, thus closing connection between contact points 36 and 37 and causing operation of the corresponding magnetic registering device. The pivotal mounting of the frame 19 permits said frame and the star wheel carried thereby to be disposed in position to be positively engaged by each passing fruit and permits the frame to yield upwardly to a sufficient extent to allow the fruit to pass therebeneath, thus insuring uniform operation regardless of slight variations in the diameter of the fruit or in the particular dimension of the fruit which is presented to the star wheel. So long as the fruit in any particular size is supplied at such a rate that it may be handled by the main counting element 9 alone, the corresponding gate 14 may remain in lowered or closed position so that all of the fruit is directed into engagement with the main counting element. The passage of each fruit of that size will, therefore, cause operation of the corresponding main magnetic register 40.

However, when the supply of fruit in any particular size exceeds the capacity of the main counting element, as when there is a relatively high proportion of fruit of that size in any given lot, the corresponding gate 14 may be raised to the position shown at 14' so as to permit some of the fruit of that size to pass through the upper or auxiliary passage between the partitions 12 and 8 and operate the auxiliary counting element in the same manner as described above for the main counting element. Simultaneously with the opening of said gate this particular auxiliary counting element is placed in operative connection with one of the auxiliary registering devices for that grade of fruit, by suitable manipulation of the multiple-throw switch for that auxiliary registering device. For example, assuming that there is an excess of fruit in the second size of grade C, the auxiliary counting element indicated at F in Fig. 7 will be placed in operation, and one of the multiple-throw switches such as F' will be operated to place the central contact arm 54 thereof in connection with the particular contact 55 which is connected to said counting element F, thus connecting said counting element to the auxiliary registering device F''. Said auxiliary counting device will thereafter operate to register the excess fruit in that particular size. In case there should also be an excess of fruit in another size of the same grade, the other multiple-throw switch may be operated to place the other auxiliary registering device in operative connection with the auxiliary counting element for said other size. It is evident that the above arrangement greatly increases the flexibility of the system, for a given total number of registering devices, and enables the auxiliary registering devices to be selectively connected so as to count the excess fruit of any particular size in which an overload occurs. Obviously, there may be any desired number of auxiliary registering devices less in number than the main registering devices of the corresponding set, the number of such auxiliary registering devices being sufficient to take care of any overload conditions which may be simultaneously encountered in any two or more sizes of each grade of fruit.

When any particular shipment or lot of fruit has been completely counted, the readings of the main and auxiliary registering devices may be noted, and the turnback shafts 65 may then be operated so as to simultaneously restore all of the registering devices of each set to zero position, in readiness for counting the next lot or shipment of fruit.

We claim:

In a fruit counting apparatus, the combination of fruit conveying means having its upper surface inclined from the horizontal transversely with respect to the direction of travel thereof, whereby fruit delivered to said conveying means tends to move toward the lower side thereof, guide means defining two parallel runways extending in the direction of travel of said conveying means for guiding the fruit carried by said conveying means, one of said runways being disposed over a portion of the conveying means at a lower level than the other of said runways so as to cause fruit to preferentially enter said one runway by the action of gravity, a main counting device mounted in said one runway, an auxiliary counting device mounted in said other runway, each of said counting devices being operable by engagement therewith of fruit moving in the respective runways, and means for delivering fruit to said conveying means at points in advance of said guide means, whereby all fruit delivered to said conveying means is caused to enter said one runway when the rate of delivery of said fruit is not greater than the capacity of said one runway and fruit delivered to said conveying means at a rate exceeding the capacity of said one runway is caused to enter said other runway.

WILLIAM C. SCHEU.
JOSEPH H. HEMMERLY.